United States Patent [19]

Davis et al.

[11] Patent Number: 5,615,347
[45] Date of Patent: Mar. 25, 1997

[54] METHOD AND APPARATUS FOR LINKING IMAGES OF SLIDERS ON A COMPUTER DISPLAY

[75] Inventors: Lisa L. Davis, Seattle, Wash.; Susan M. Bartalo, Palo Alto, Calif.; James L. Mensch, San Jose, Calif.; Mark C. Pontarelli, San Jose, Calif.; Robert E. Snow, Jr., San Jose, Calif.

[73] Assignee: Apple Computer, Inc., Cupertino, Calif.

[21] Appl. No.: 435,639

[22] Filed: May 5, 1995

[51] Int. Cl.⁶ ................................................. G06F 3/14
[52] U.S. Cl. ........................ 395/349; 395/346; 395/974; 395/970
[58] Field of Search ................................. 395/155–161

[56] References Cited

U.S. PATENT DOCUMENTS

| | | | |
|---|---|---|---|
| 5,375,199 | 12/1994 | Harrow et al. | 395/159 |
| 5,386,568 | 1/1995 | Wold et al. | 395/700 |
| 5,404,316 | 4/1995 | Klingler et al. | 395/161 X |
| 5,469,540 | 11/1995 | Powers, III et al. | 395/158 |
| 5,491,782 | 2/1996 | King et al. | 395/159 |
| 5,511,157 | 4/1996 | Wang | 395/155 X |

OTHER PUBLICATIONS

Walkenbach, J., "Excel tool offers graphical controls", Info World, vol. 15, Issue 14, Apr., 1993, p. 105.
Macintosh User's Guide, Apple Computer, Inc., 1993, pp. 139, 151, 159, and 160.

Primary Examiner—Raymond J. Bayerl
Assistant Examiner—A. Katbab
Attorney, Agent, or Firm—Hickman Beyer & Weaver

[57] ABSTRACT

A method and apparatus for linking GUI sliders displayed on a computer screen. A master slider and a slave slider are displayed, each including a knob and a guide. The master knob can be moved along the master guide in response to input from a user, such as with a pointing device. The movement of the slave knob of the slave slider is influenced along the slave guide based on the position and/or movement of the master knob. The slave slider can preferably be in a full slave mode or in a partial slave mode. In full slave mode, the slave knob tracks the movement of its master knob and cannot be selected directly by the user. In partial slave mode, a slave knob can be directly selected and moved by the user, but includes a limit to its movement based on the master knob's current position. Graphical indications of the limits and/or influence on the slave slider are displayed, such as half tone displays on the screen and lines indicating the limits to movement. A free mode can also be provided for a slave slider to provide the slave knob with completely independent movement from its master knob.

46 Claims, 8 Drawing Sheets

METHOD AND APPARATUS FOR LINKING IMAGES OF SLIDERS ON A COMPUTER DISPLAY

TECHNICAL FIELD

The present invention relates generally to computer systems, and, more particularly, to methods for providing graphical user interface (GUI) controls on the screens of computer systems.

BACKGROUND ART

Computer system interfaces typically include command-style interfaces, in which commands are entered into the computer system with a keyboard or similar device, and graphical user interfaces or GUIs, in which graphical objects are selected and manipulated using a pointing device such as a mouse or trackball. GUIs are becoming increasingly popular with computer users. It is generally accepted that computers having graphical user interfaces are easier to use, and that application programs are more quickly learned in a GUI environment than in a non-GUI environment.

Typically, a GUI offers several types of controls on a computer screen. For example, when using the Macintosh® Operating System by Apple Computer, Inc., a number of GUI controls are provided including check boxes, radio buttons, pull down menus, and sliders.

Slider controls typically are the GUI metaphor for linear potentiometers often found on stereos, graphical equalizers, etc. Sliders are therefore often used for volume or other magnitude adjustments. For example, a computer can adjust the GUI slider to adjust the volume level of speakers connected to the computer. Sliders and the like can also be used for selecting different options, preferences, alternatives, etc. that a program offers.

Sometimes, multiple GUI sliders are provided for controlling different functions and parameters of an application program. In some instances, the setting of one slider can be related to the settings of other sliders. For example, a first slider controlling the resolution of displayed pixels on a video screen might be set to a high resolution level, impacting a second slider controlling colors displayed on the screen. With current slider implementations, the effect of the first slider on the second slider would be unknown to the user. The user currently would be able to set either slider to any setting, resulting in error or requiring software intervention to correctly resolve the interdependencies of the sliders. Therefore, the visual settings of the GUI sliders may not correctly represent the true settings of the parameters in the system.

DISCLOSURE OF THE INVENTION

A method and apparatus of the present invention provides linked multiple sliders on a display of a computer system. Some of the sliders are master sliders, and some of the sliders are slave sliders influenced by the master sliders.

More particularly, a method for linking sliders comprises displaying a master slider and a slave slider on a display of a computer system. The master slider includes a master knob and a master guide, and the slave slider includes a slave knob and a slave guide. The master knob can be moved with a mouse or other pointing device along the master guide. The movement of the slave knob of the slave slider can be influenced by the master knob.

The slave slider can preferably be in a full slave mode or in a partial slave mode. In full slave mode, the slave knob tracks the movement of the master knob, i.e., the slave knob moves the same distance and direction as the master knob when the master knob is moved. The slave knob preferably cannot be selected directly by the user in full slave mode. In addition, in a preferred embodiment, slave knobs are aligned to the master knob when full slave mode is entered. The slave slider in full slave mode is preferably displayed in half tone to provide visual feedback of its full slave status.

In partial slave mode, a slave knob can be selected and moved by the user using a pointer. However, the movement of the slave knob is limited by the master knob in that the slave knob cannot be moved past a ceiling (or floor) on the slave guide as determined by the master knob's position. An indicator line preferably extends through the master knob to indicate the floor or ceiling limit for the slave knob. This line is preferably displayed when the slave knob is to be moved past the limit or when the master knob is moved. In addition, in partial slave mode, the slave knob preferably tracks the movement of the master knob when the master knob passes by the position of the slave knob.

Further sliders which can be slaves of a master slider or of another slave slider can also be provided. Also, a free mode can be provided for a slave slider, in which the slave knob can be moved completely independently of its master slider. A computer apparatus with linked sliders includes a digital processor, memory, and a display screen in addition to mechanisms for implementing the above-described features.

The linked sliders of the present invention provide a easy-to-use GUI for adjusting interrelated parameters of a computer system. Users can perceive interrelationships of the sliders visually, thus obtaining an immediate understanding of how the parameters will be affected by their selections.

These and other advantages of the present invention will become apparent to those skilled in the art upon a reading of the following specification of the invention and a study of the several figures of the drawing.

BEST MODES FOR CARRYING OUT THE INVENTION

The present invention is well suited for many types of computer systems, including desktop computer systems, portable computer systems, pen-based systems, and other computer systems which support graphical user interfaces (GUIs).

Figure 1:
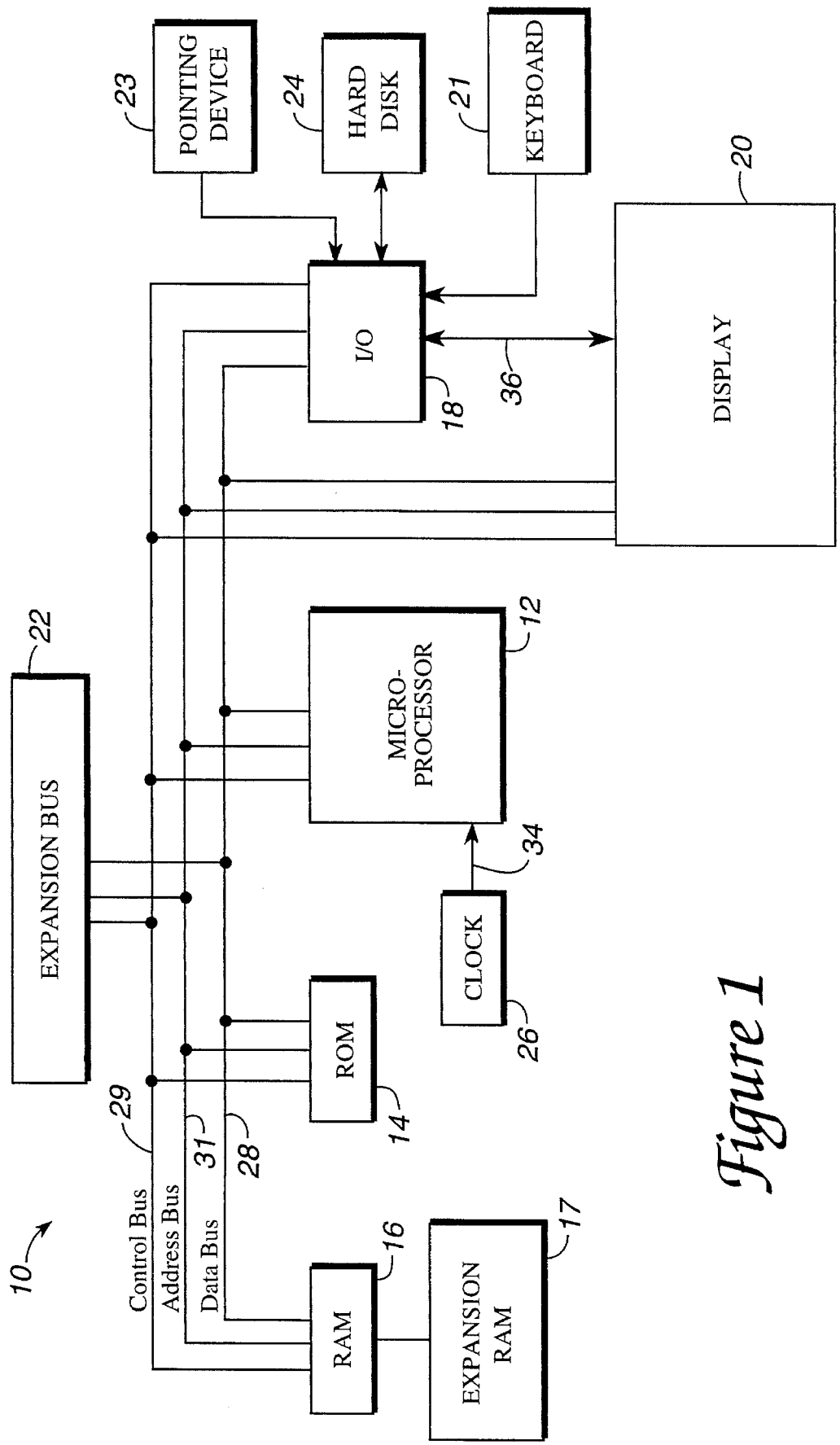
FIG. 1 is a block diagram of a computer system in accordance with the present invention.

As shown in FIG. 1, a computer system 10 in accordance with the present invention includes a central processing unit (CPU) 12, read only memory (ROM) 14, random access memory (RAM) 16, expansion RAM 17, input/output (I/O) circuitry 18, display 20, expansion bus 22, mass storage unit 24, and a real-time clock 26. Other components and/or peripherals can also be included. Computer system 10 can be, for example, a desktop computer system such as the Power Macintosh® available from Apple Computer, Inc., of Cupertino, Calif. Alternatively, computer system 10 can be a portable computer, a pen-based computer, an AT-class personal computer (PC), a UNIX-based workstation, or any computer system capable of supporting a GUI.

The CPU 12 is preferably a commercially available, single chip microprocessor such as a reduced instruction set computer (RISC) chip such as the PowerPC™ chip available from Motorola. Alternatively, CPU 12 can be a complex instruction set computer (CISC) chip. CPU 12 is coupled to ROM 14 by a data bus 28, control bus 29, and address bus 31. ROM 14 contains the basic operating system for the computer system 10. CPU 12 is also connected to RAM 16 by busses 28, 29, and 31 to permit the use of RAM 16 as scratch pad memory. Expansion RAM 17 is optionally coupled to RAM 16 for use by CPU 12. CPU 12 is also coupled to the I/O circuitry 18 by data bus 28, control bus 29, and address bus 31 to permit data transfers with peripheral devices.

UO circuitry 18 typically includes a number of latches, registers and direct memory access (DMA) controllers. The purpose of I/O circuitry 18 is to provide an interface between CPU 12 and such peripheral devices as display assembly 20 and mass storage 24.

Display 20 includes a display screen, such as an LCD or CRT monitor, for displaying images to a user and is coupled to I/O circuitry 18 by data bus 36. Display 20 receives data from I/O circuitry 18 via bus 36 and displays that data. Alternatively, display 20 can be a display assembly for a pen-based computer system that is both an input and an output device that is coupled to I/O circuitry 18 by a bi-directional data bus 36.

Other types of user inputs can also be used in conjunction with the present invention. A keyboard 21 is preferably coupled to microprocessor 12 through I/O circuitry 18 to allow the user to input text characters, commands, etc. Preferably, a pointing device 23 such as a computer mouse, a track ball, a stylus, or the like can be used to manipulate a pointer on display 20 by inputting signals to I/O circuitry 18 indicative of the position of the pointing device, as is well known to those skilled in the art. As used herein, the term "pointing device" and the like will refer to any mechanism or device for pointing to a particular location on a screen of a computer display.

Some type of mass storage 24 is generally considered desirable. Mass storage 24 can include commercially available hard disk drives, for example.

Expansion bus 22 is coupled to the data bus 28, the control bus 29, and the address bus 31, similar to the other components in system 10. Expansion bus 22 provides extra ports to couple devices such as modems, display switches, microphone, speaker, video card, CD ROM drive, network interface card, etc. to the CPU 12.

Figure 2A:
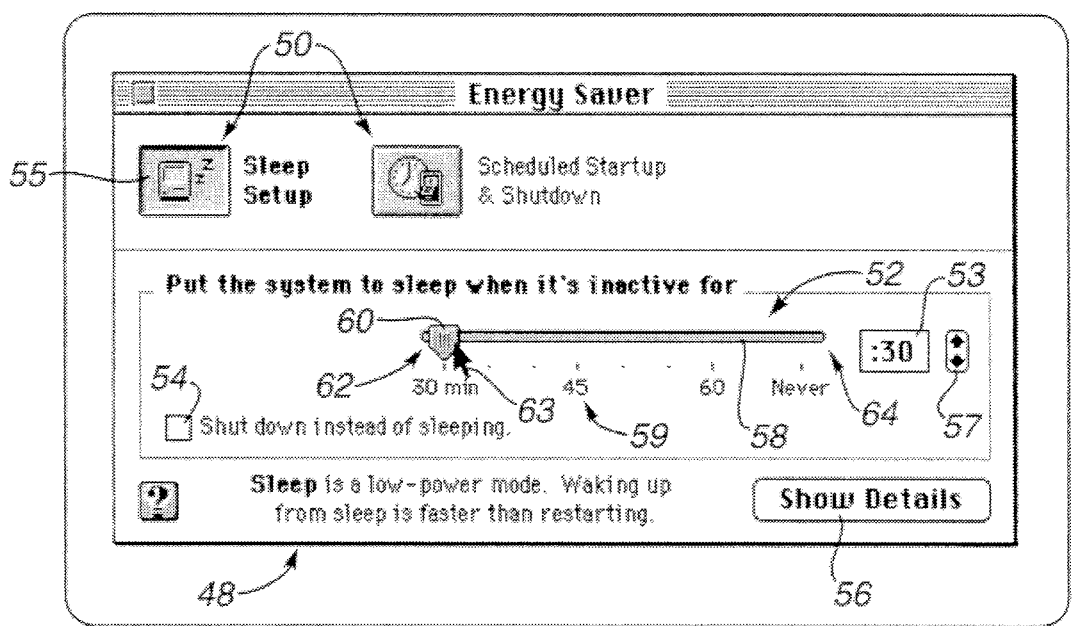
FIG. 2a is an illustration of a display screen showing a single slider of the present invention.

In FIG. 2a, a GUI image on a display screen 20 of computer system 10 is shown. The image displayed is derived from an Apple Macintosh® computer display; however, many computers capable of providing GUI environments can produce similar images.

Window 48 is displayed by a currently active application program. As referenced herein, "application program" refers to programs such as word processors, spreadsheets, drawing programs, utilities, routines, tool boxes, etc. that can run on the computer system and provide a particular function, process, or application. In the described example, window 48 is displayed by a "energy saver" utility that controls the power of computer system 10. This utility controls the "sleep" mode of the computer, i.e., when the computer enters a mode in which minimal or no power is consumed. Preferably, the user can select how long the computer waits before power-down ("sleep") occurs. This is described in greater detail below.

Such an application program is quite useful on portable computers, where power consumption is minimized to conserve battery power. This type of application program also can be utilized on desktop computers or other computers to reduce power consumption when the computer is not being used.

Types of "sleep" or levels of power reduction can be distinguished. For example, portable, battery-based computer systems can completely power down during sleep to essentially eliminate power consumption. Desktop or networked computers, in contrast, may power down the screen and other peripherals, but leave some components powered to, for example, receive data from a network, even while in a sleep mode.

Display screen 20 displays application window 48, which appears as shown in FIG. 2a when it is first displayed. Window 48 provides mode buttons 50, a slider 52, slider display field 53, a check box 54, and a details button 56. Buttons 50 allow a user to select different functions of the current application program and also indicate the currently-selected function. For example, icon 55 on a button 50 is shown in a darker shade to indicate that the computer "sleep" function has been selected. The controls for the selected function are preferably displayed in the lower section of window 48.

Slider 52 is provided in the lower section of window 48 in the example of FIG. 2a. Slider 52 includes a slider guide 58 (also known as a "track", "slider bar", "groove", "slot", etc.), a scale 59, and a "knob" 60 (also known as a "thumb"

or "indicator"). The term "slider", as used herein, includes slider guide 58 and knob 60 at a minimum. The term can additionally include scale 59, the background area of the screen around guide 58, and other components as described below. Guide 58 graphically indicates the allowed range of horizontal movement of knob 60, with the lower limit or "floor" at an end 62 and the upper limit or "ceiling" at an end 64. Scale 59 includes a number of indicia, such as numbers, which indicate the magnitude of selections available on the guide 58. In the example of FIG. 2a, scale 59 ranges from a lower limit of "30 minutes" to an upper limit of "Never." For the "energy saver" program example, this indicates the time period that the computer must be inactive before power-down occurs, which can range from a minimum of 30 minutes to a maximum of never.

Knob 60 can be selected by a user with a pointer 90 that is controlled by a mouse or the like and moved along guide 58 between ends 62 and 64. In the described embodiment, guide 58 is substantially horizontal such that knob 60 can be moved either to the left or the right in an "x-direction" for an "x-distance", as indicated by x-axis 61. Preferably, pointer 90 is controlled by a pointing device by moving the pointer to knob 60, activating the pointing device, and dragging the knob 60 with the pointer 90.

Knob 60 points to the current magnitude (e.g. volume, time, etc.) selected by the slider. For example, in FIG. 2a, knob 60 is set at the lower limit of scale 59, "30 minutes." Thus, the computer system 10 will power down after 30 minutes of inactivity. "Inactivity" can, for example, be defined as the lack of input from a user, i.e., the user does not enter data through a keyboard, mouse, stylus, or other input device to computer system 10.

Slider 52 can be implemented in a variety of ways, some of which are discussed below with refrence to FIG. 3. Preferably, in a graphical user interface, the knob 60 can be moved by selecting the knob with a pointer or by specifying a value in slider display field 53 (described below). In other embodiments, the knob can be moved by other mechanisms. For example, a user can hit a cursor direction key on keyboard 21 to move the knob in a desired direction along guide 58. In an alternate embodiment, the user "clicks" at a location in guide 58 to cause the knob to move directly to that location. By "click", it is meant that the pointer device is activated such as by pressing a button to cause an action as defined by the pointer position on the computer screen. The slider 52 is shown having a horizontally-oriented guide 58. In alternate embodiments, the guide can be oriented in other directions or multi-dimensionally.

Slider display field 53 is provided to show a symbolic value of the current selection of knob 60 on scale 59. For example, in FIG. 2a, slider display field 53 shows a value of "30", which is the value (in minutes) that knob 60 is pointing to at the end 62 of guide 58. If knob 60 is dragged to point to a new value on scale 59 by the user, then slider display field 53 shows the corresponding changed value. Likewise, if the value in slider display field 53 is changed by the user, then knob 60 is automatically moved to the value on scale 59 corresponding to the entered value. The value in display 53 can be changed, for example, by moving a pointer over the display, clicking a button on a pointing device, and entering a value from a keyboard, as is well-known to those skilled in the art. The value in display 53 can also preferably be changed using control arrows 57. A user can move pointer 63 over an up or down arrow 57 and click the pointing device to increase or decrease the value accordingly. Knob 60 preferably moves according to the changed value along the guide 58 alter each change in value.

In the described example of FIG. 2a, selection box 54 controls whether the computer system 10 shuts down instead of "sleeping." If this box is selected, then the computer system completely powers down instead of leaving some components powered. Other controls specific to the application program can be provided in alternate embodiments.

Details button 56 is provided to allow a user to access additional sliders pertaining to the "sleep" function of computer system 10. This is described in greater detail with reference to FIG. 2b.

Figure 2B:
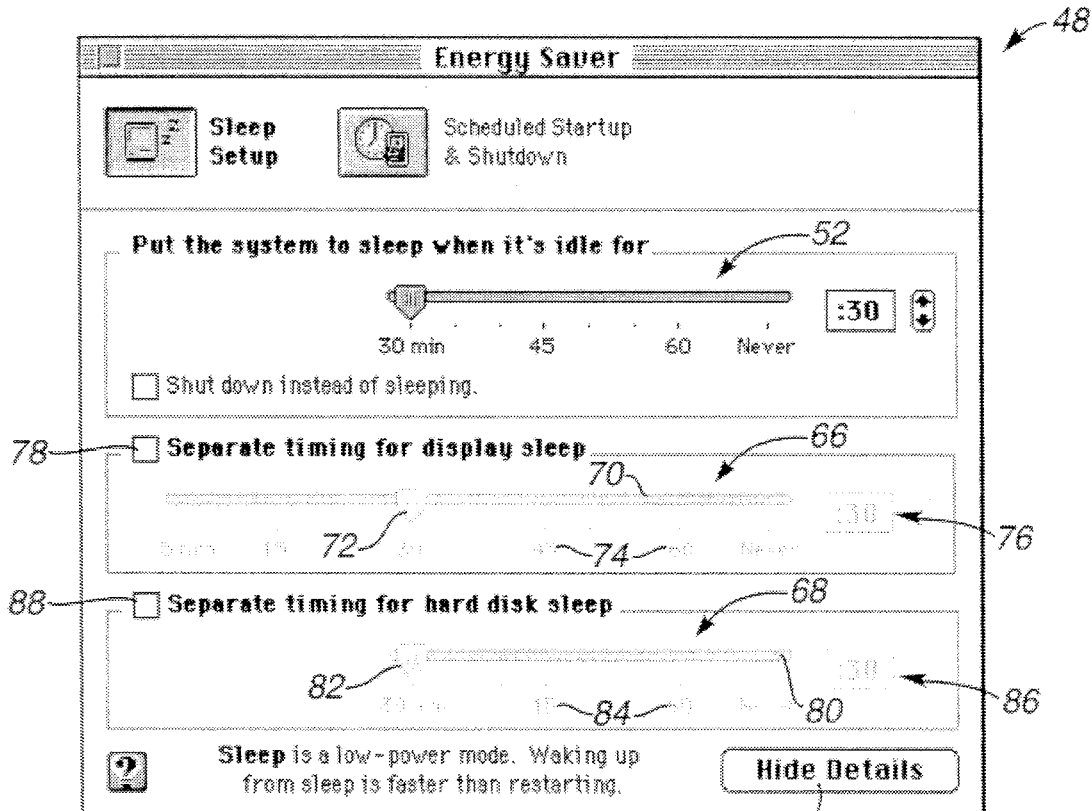
FIG. 2b is an illustration of the master and slave linked sliders of the present invention, where the slave sliders are in full slave mode.

FIG. 2b is an illustration of application window 48 showing additional sliders after the "show details" button 56 has been activated. When button 56 of FIG. 2a is selected, window 48 is increased in size on display screen 20 to show additional sliders, as seen in FIG. 2b. In the described embodiment, two additional sliders 66 and 68 are displayed.

Slider 66 is a display sleep slider that sets the inactivity period of computer system 10 before the display 20 powers down ("sleeps"). As described herein, slider 66 is referred to as a "slave" slider, since the settings and movement of slider 6 are influenced by slider 52. Slider 52 is referred to as a "master" slider, since slave slider 66 is influenced by its position and movement, as described below. To be a master slider, a slider must have at least one slave slider. However, a slave slider can also be the slave of another slave slider.

Slave slider 66 includes a slave guide 70 and a slave knob 72, which are similar to guide 58 and knob 60 of master slider 52 as described with reference to FIG. 2a. Slave slider 66 also includes a scale indicia 74 and a display field 76, which are similar to the corresponding components of slider 52. Note that slave guide 70 can be longer or shorter than master guide 58. In FIG. 2b, this indicates that the display sleep time can be set to a shorter inactive time than the entire computer system.

Although guide lengths can differ, the scale indicia 59 and 74 of master and slave are preferably aligned and preferably set at the same scale so that indicia along a guide are spaced apart by the same distance on screen 20. Thus, with the horizontally-oriented sliders of FIGS. 2a–2i, scale indicia 59 are vertically aligned with corresponding scale indicia 74, i.e., "45 minutes" of slider 52 has the same "x-position" (position on the x-axis 61 ) as "45 minutes" of slider 66. This allows a user to graphically/spatially determine that master and slave sliders are pointing to the same value.

Slave slider 66 and its related portions are shown in a half tone, i.e., a less dense representation than master slider 52. This is to indicate that slave slider 66 is in a "full slave mode", where the slider cannot be manipulated independently of master slider 52. Full slave mode also means that slave slider 66 will track the movement of master slider 52, as described below. Full slave mode is indicated by mode box 78, which can be toggled by the user. When box 78 is empty, as shown, slave slider 66 is in full slave mode. When box 78 has an "X" or similar indicia displayed in it, slave slider 66 is in "partial slave mode", which is described in detail below.

Slider 68 is a hard disk sleep slider and sets the inactivity period of computer system 10 before hard disk 24 powers down. In the described embodiment, slider 68 is a slave slider of master slider 52, similar to the master-slave relationship between master slider 52 and slave slider 66. The movement of slave slider 68 is therefore influenced by master slider 52. It should therefore be noted that a master slider can have multiple slaves.

Like slave slider 66, slave slider 68 includes a guide 80, a slave knob 82, scale indicia 84, and display field 86. Slider 68 also includes mode box 88, which indicates whether slave slider 68 is in full slave mode or partial slave mode. In FIG. 2b, slider 68 is in full slave mode.

Details button 56 currently displays the words "Hide Details", which indicates that, if the user selects button 56, the detail sliders 66 and 68 will be removed from screen 20 so that only master slider 52 is displayed, as shown in FIG. 2a. Details control 56 is thus a toggle to display or not display the detailed (slave) sliders.

Figure 2C:
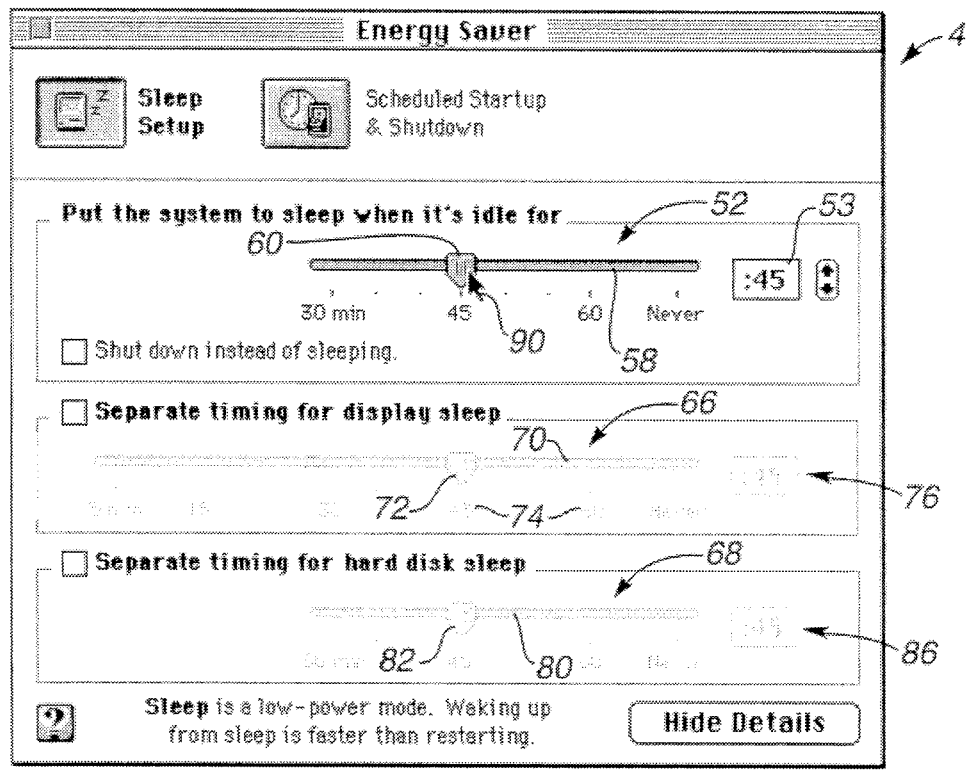
FIG. 2c is an illustration of the master and slave sliders of FIG. 2b in which a master knob is moved by the user.

FIG. 2c shows application window 48 illustrating the operation of full slave mode. Pointer 90, shown as an arrow, has been moved onto master knob 60. Pointer 90 (sometimes known as a "cursor") is preferably moved by the user manipulating a pointing device, such as a mouse or trackball. Alternatively, a keyboard or other input device can be used to control pointer 90 or a similar selection object. Also, a stylus-type pointer can be contacted with knob 60 on a pressure-sensitive display screen to have the same effect as using a pointer to provide a pointing mechanism, as is well-known to those skilled in the art.

Knob 60 has been moved or "dragged" by the user with pointer 90 from its position of "30 minutes" on guide 58 shown in FIG. 2b to a new position at "45 minutes" shown in FIG. 2c. Display field 53 has correspondingly been updated with the new value corresponding to the position of knob 60 along scale 59.

Slave sliders 66 and 68 are in full slave mode, and the movement of the knobs of these sliders are thus directly influenced by the movement of master knob 60. As master knob 60 is moved, slave knob 72 of slider 66 and slave knob 82 of slider 68 are preferably moved the same distance along their respective guides as master knob 60, thus keeping all slave knobs vertically aligned with master knob 60. The display fields 76 and 86 are updated to the new value pointed to by slave knobs 72 and 82. Note that master knob 60 can also be moved by changing the value in display 53 of master slider 52, which will also move slave knobs 72 and 82 a corresponding distance.

Thus, in full slave mode, slave knobs are preferably moved the same distance and direction as their master knob, i.e., as referred to herein, the slave knobs "track" the movement of their master knob. In the embodiment of FIG. 2c, whenever full slave mode is initially selected or toggled from any other mode (such as partial slave mode, described below), slave knobs 72 and 82 are automatically vertically aligned with master knob 60 regardless of where the slave knobs may have been positioned before. Thus, in the full slave mode of the described embodiment, a master knob is preferably aligned with corresponding slave knobs.

Figure 2D:
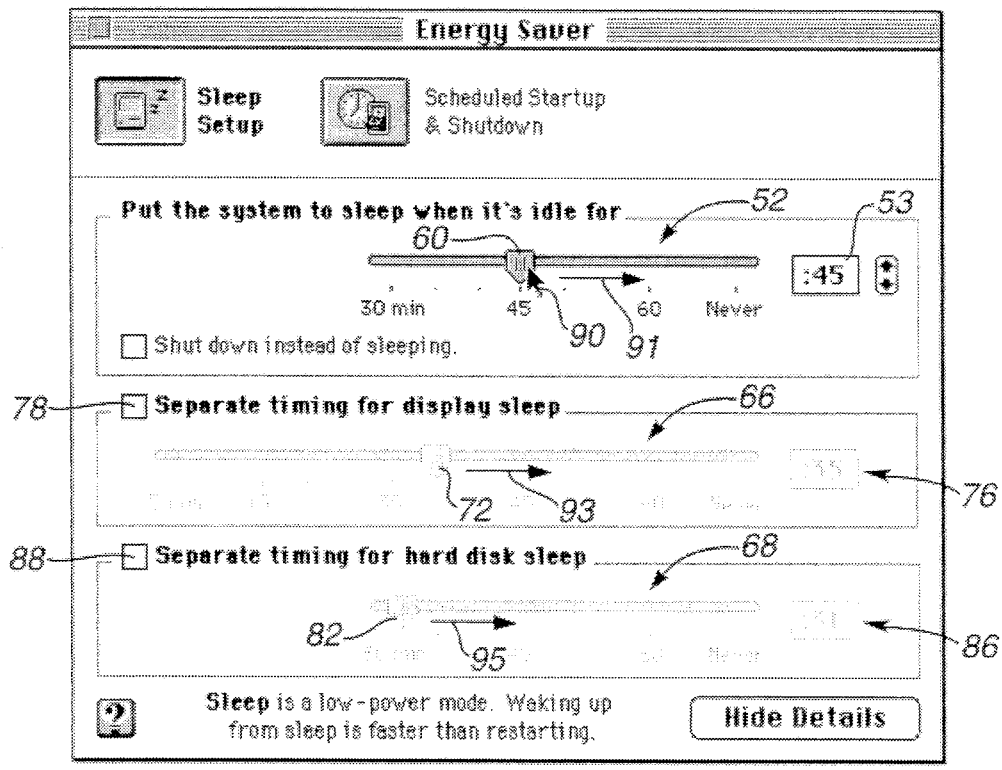
FIG. 2d an illustration of an alternate embodiment of the master and slave sliders of FIG. 2b in which slave knobs do not automatically align with their master knob.

FIG. 2d is a diagrammatic illustration of an alternate embodiment in which slave knobs in full slave mode are not necessarily aligned with their master knob. In this example, master knob 60 of master slider 52 is being dragged by a pointer 90 in the direction of arrow 91. Slave knob 72 of slider 66 is currently positioned at a different x-position than master knob 60. This can be accomplished by the user, for example, previously selecting mode box 78 to cause slider 66 to toggle to partial slave mode, and moving slave knob 72 independently of master knob 60, as described below. The user then could select mode box 78 to toggle slider 66 back to full slave mode. In the embodiment of FIG. 2d, slave knobs are not automatically aligned with their master knobs when partial slave mode is toggled back to full slave mode. Thus, knob 72 remains at an offset x-distance from master knob 60.

Knob 72 is in full slave mode, as indicated by the half tone shade at which slider 66 is displayed. Thus, when master knob 60 is moved in the direction indicated by arrow 93, slave knob 72 tracks the movement in the same direction, as indicated by arrow 93. Slave knob 72 preferably moves the same distance that master knob 60 moves. Display 76 shows the current selection of slave knob 72 and preferably changes in accordance with slave knob 72 as the knob is moved.

Slider 68 is similar to slider 66 described above. Slave knob 82 of slider bar 68 is positioned at a different x-position than either master knob 60 or slave knob 72. Since slave knob 82 is in full slave mode and is a slave of master slider 52, slave knob 82 tracks the movement (distance and direction) of master knob 60, as indicated by arrow 95. Display 86 shows the current selection of slave knob 82 and preferably changes in accordance with slave knob 82 as the knob is moved.

Preferably, slave knobs are not moved in a direction once they reach a limit to that direction of movement in guides 70 or 80, regardless of the master knob's movement. For example, if slave knob 82 had a master that was allowed to be positioned below 30 minutes, but slave knob 82 had a minimum limit of 30 minutes, then slave knob 82 would be set at 30 minutes for any setting of the master knob below 30 minutes. Once the master knob was moved back into the allowable range of slave knob 82, the slave knob would resume tracking the master knob's movement (either at an offset, as in FIG. 2d, or aligned, as in FIG. 2c).

Figure 2E:
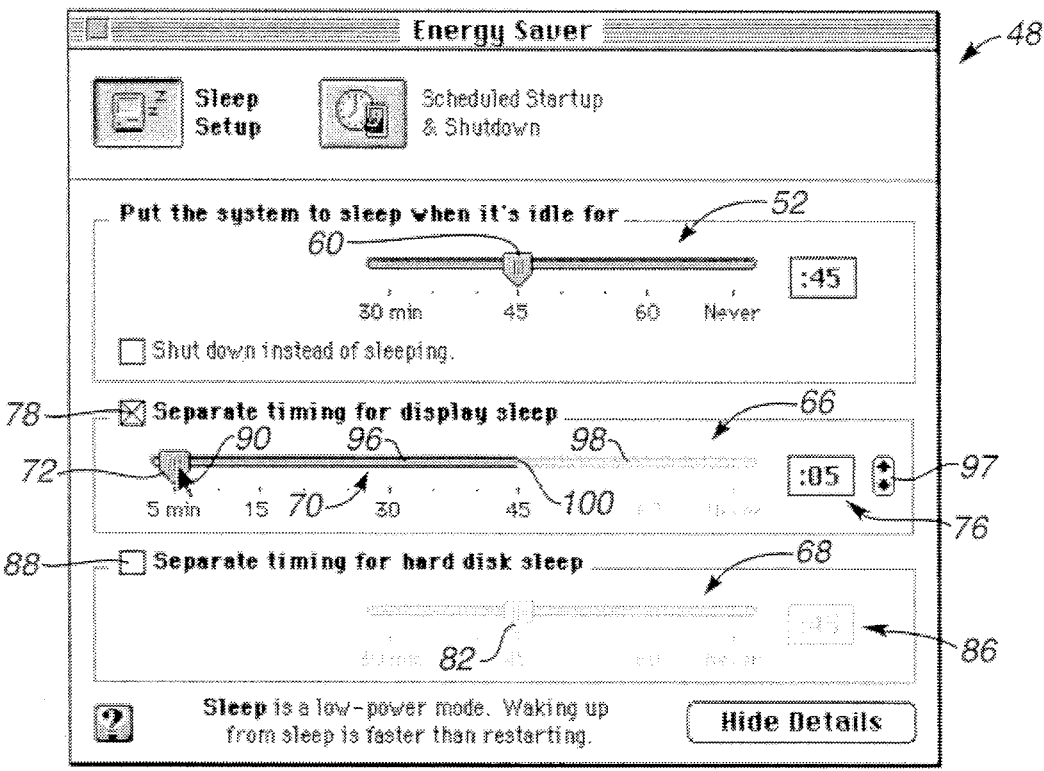
FIG. 2e is an illustration of the master and slave sliders of the present invention in which a slave knob is in partial slave mode.

FIG. 2e is an illustration of application window 48 in which slave slider 66 has been changed from full slave mode to partial slave mode. The user has preferably selected mode box 78 (or a similar control in a different embodiment) to cause the mode to toggle. Partial slave mode is indicated by the "X" in mode box 78.

In partial slave mode, slave slider 66 is partially free from influence from master slider 52. Slave knob 72 can be moved independently of master knob 60 in this mode. Preferably, the user selects slave knob 72 with pointer 90 and can "drag" the slave knob in either x-direction along guide 70, similar to master knob 60 as described with reference to FIG. 2a. However, a difference from master slider 52 is that slave knob 72 is only "partially" free. Slave knob 72 can be freely moved only in free portion 96 of guide 70, which is indicated as the darker, fully visible portion of guide 70. Slave knob 72 cannot be moved into the prohibited portion 98 of guide 70, which is indicated by the same half tone images. Thus, if the user attempts to move slave knob 72 past the limit 100 between the free portion 96 and the prohibited portion 98, slave knob 72 cannot move into the prohibited portion. This is described in greater detail with reference to FIG. 2f.

The position of limit 100 is preferably established by the position of master knob 60. In the described embodiment, limit 100 is positioned at the same x-position on guide 70 that master knob 60 is positioned on guide 58, thus preventing slave knob 72 front moving to a higher corresponding position on guide 70 than master knob 60 is on guide 58, as described below. Limit 100 thus tracks the movement of master knob 60 as master knob 60 is moved. This limit is provided to enforce the application of sliders 52 and 66 in the computer "sleep" embodiment in the example of FIG. 2f. The display cannot be turned off after the entire computer system is turned off, so slave knob 72 is prevented from moving to a greater inactive time than the master knob 60.

Such relationships between sliders can be provided in other applications as well, and these relationships can be easily viewed and understood by the user by visually distinguishing the different portions 96 and 98 of guide 70. In other embodiments, limit 100 can be positioned as a lower limit (floor) to slave knob 72 instead of an upper limit (ceiling). In yet other alternate embodiments, limit 100 can be set at a constant offset position from master knob 60, such as 5 minutes, for a particular application.

When mode box 78 is toggled to partial slave mode, arrow display controls 97 for display 76 are preferably also displayed. Arrows 97 allow the user to increase or decrease the number in display 76, which will also move slave knob 72 a corresponding amount on guide 70.

Slave slider 68 is still in full slave mode, as indicated by the empty mode box 88. Slave knob 82 thus fully tracks the movement master knob 60 when the master knob is moved, as described above. A user cannot currently select slave knob 82 and move it independently of the master knob.

Figure 2F:
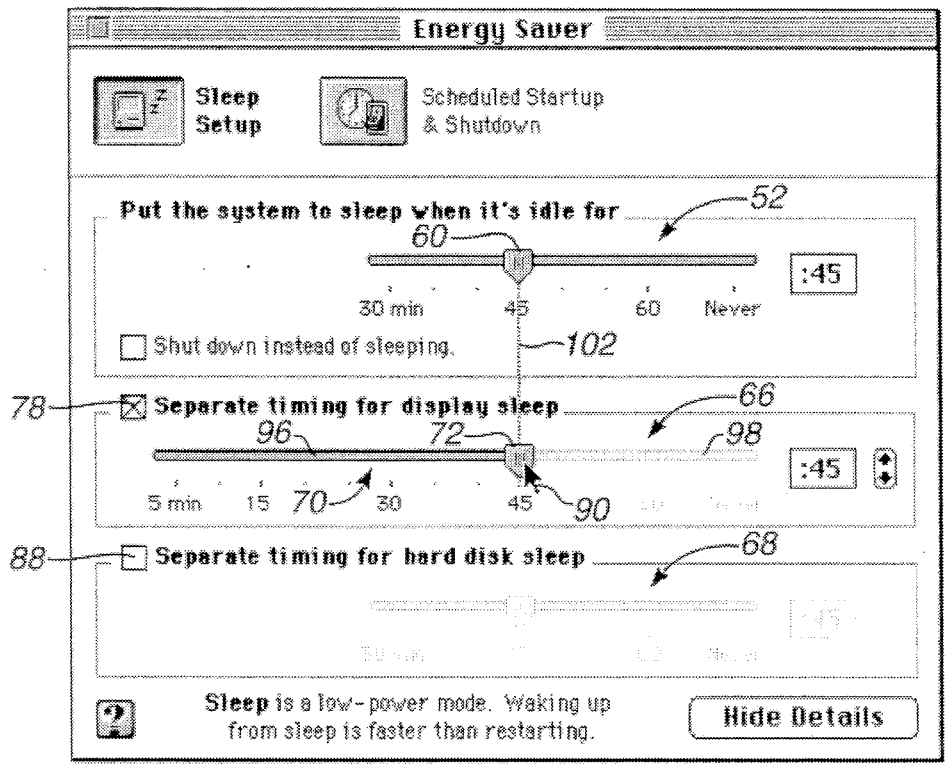
FIG. 2f is an illustration of the master and slave sliders of FIG. 2e in which a slave knob is attempted to be moved past an upper limit.

FIG. 2f is an illustration of application window 48 in which slave slider 66 is in partial slave mode, and where slave knob 72 has been moved to the limit 100 of the free portion and prohibited portion of guide 70. The user has selected slave knob 72 using pointer 90 and has moved slave knob 72 to limit 100 (which is "underneath" the knob 72 in FIG. 2f). Preferably, a line 102 is displayed extending from the current position of master knob 60 on guide 58 to the limit 100 of guide 70 when slave knob 72 is attempted to be moved past its limit designated by master knob 60, which is greater than the x-position of the master knob in the example of FIG. 2f. The display of line 102 directly informs the user when the limit to movement has been reached and that this limit is dependent on the position of the master knob 60. This line is preferably only displayed when the user attempts to exceed the allowed movement of a slave knob, i.e. the line is removed from window 48 and the screen when the user is no longer trying to move slave knob 72 into prohibited portion 98 or when the user moves the slave knob back into free portion 96 of guide 70.

Figures 2G, 2H:
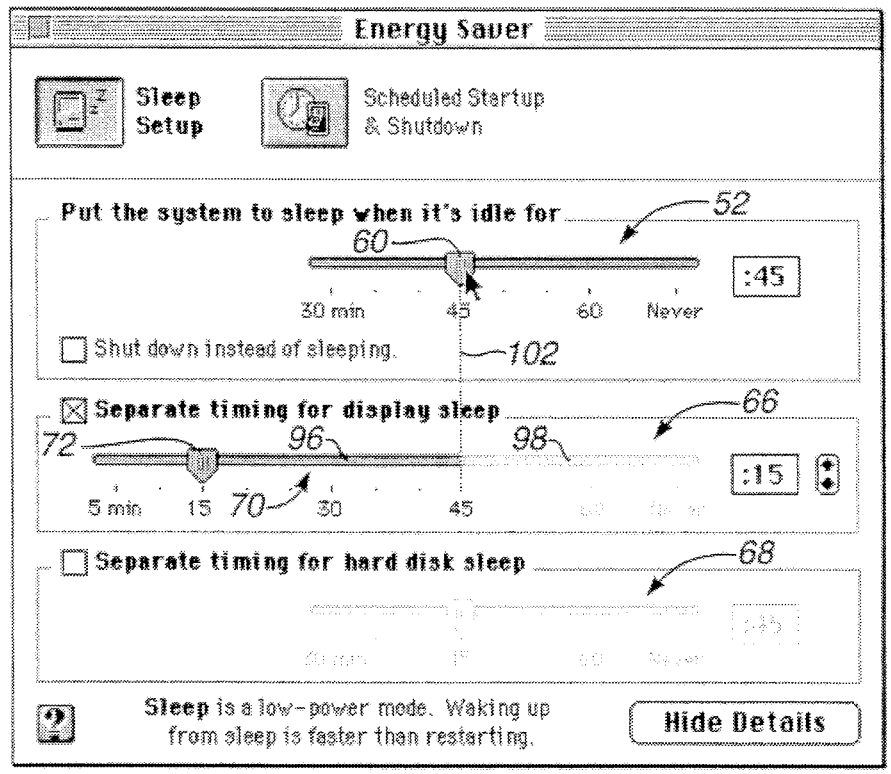
FIG. 2g is an illustration of the master and slave sliders of FIG. 2e in which a master knob is moved and a slave slider is in partial slave mode.
FIG. 2h is an illustration of the master and slave sliders of FIG. 2e in which two slave sliders for the master slider are in partial slave mode.

FIG. 2g is an illustration of application window 48 in which the user moves master knob 60 while a slave slider is in partial slave mode. The user has selected and is moving master knob 60. Line 102 is preferably displayed when master knob 60 is selected, e.g. a button on a pointing device is pressed down. As master knob 60 is moved by the user, line 102 preferably tracks the movement of the master knob. Also, free portion 96 (designated by darker lines and shades) and prohibited portion 98 (designated by faded lines and shades) are increased or decreased in size accordingly. This indicates to the user that the limit to the slave knob's movement is set to the new position of the master knob when the master knob is moved. When the master knob is no longer selected, e.g. the button on the pointing device is released, then line 102 is removed from the screen.

In the preferred embodiment, if master knob 60 is attempted to be moved past the position of slave knob 72 in the opposite direction to the limit of movement designated by line 102, then the slave knob tracks the movement of the master knob in that direction. For example, if slave knob 72 is at a position of 35 minutes, and master knob 60 is attempted to be moved lower than 35 minutes, then slave knob 72 would be moved with (i.e., the same distance as) master knob 60 in the direction towards the lower ends of guides 58 and 70.

As used herein, the movement of a slave slider is "influenced" by the slave's master slider. When the slave slider is in full slave mode, this means that the slave knob tracks the movement of the master knob. When the slave slider is in partial slave mode, "influenced" means that the slave knob is limited in its movement based on the position and/or movement of the master knob, as shown by line 102 (and also that the slave knob can track the movement of the master knob in partial slave mode, as described in the preceding paragraph).

FIG. 2h is an illustration of application window 48 in which both slave sliders are in partial slave mode. Mode box 88 of slider 68 has been selected by the user, thus toggling slider 68 into partial slave mode. Pointer 90 indicates that the user has selected slave knob 82 and can move the knob in either direction along guide 80, similar to knobs 60 and 72 described above. Like slave knob 72, slave knob 82 is a slave of master knob 60 and is thus limited in its movement. Limit 104 of guide 80 is similar to limit 100 of guide 70 in that it prevents movement of knob 82 into the prohibited portion 106 of guide 80 while allowing independent movement of knob 82 in free portion 108 of guide 80. The position of limit 104 is the same as the current position of master knob 60, as described with reference to knob 72.

Preferably, a line (not shown) similar to line 102 is displayed when either master knob 60 is moved or slave knob 82 is attempted to be moved past limit 104. This line can be line 102, except that it is lengthened so that it extends from guide 58 to guide 80. Also like knob 72, if master knob 60 is moved past knob 82 in the direction opposite to the limit of movement, then slave knob 82 tracks the master knob in that direction.

When mode box 88 is toggled to partial slave mode, arrow display controls 110 for display 86 are preferably also displayed, similar to slave knob 66 described above. Arrows 110 allow the user to increase or decrease the number in display 86, which will also move slave knob 82 a corresponding amount on guide 80.

In the example of FIGS. 2a–2i, slave slider 68 can be used to control the amount of time that computer system 10 is to be inactive before the hard disk 24 of the computer system sleeps (turns off to conserve power consumption). Since it is not possible for the entire computer system 10 to sleep before the hard disk 24 sleeps, slave knob 82 has a ceiling that is equal to the current position of master knob 60, similar to display slave knob 72. Additional sliders can also be provided in alternate embodiments to similarly control the sleep time of other components of computer system 10.

Figure 2I:
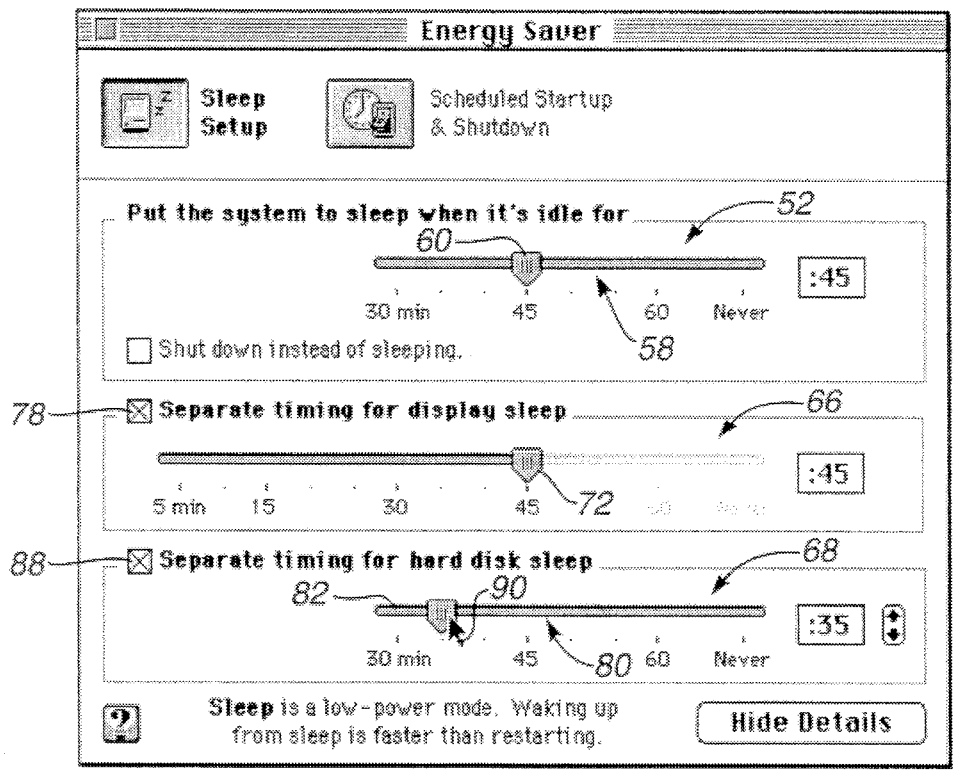
FIG. 2i is an illustration of an alternate embodiment of the master and slave sliders of FIG. 2h in which a slave slider is in free slave mode.

FIG. 2i is an illustration of window 48 showing an alternate embodiment of the present invention in which a slave slider is in a "free slave mode" or "free mode". Unlike full or partial slave modes, free slave mode allows a slave knob to be moved completely independently of the master knob's position. For example, in the embodiment of FIG. 2i, slave slider 68 can either be in full slave mode (mode box 88 unselected) or in free slave mode (mode box 88 selected). The slider is shown in free slave mode. Slave knob 82 can be moved anywhere along guide 80 by selecting slave knob with the pointer 90. A slave slider in free slave mode is still considered a "slave", since it tracks the movement of a master slave when in full slave mode. In some embodiments, some slave sliders can have full slave/partial slave modes, while other slave sliders can have full slave/free slave modes.

Figure 2J:
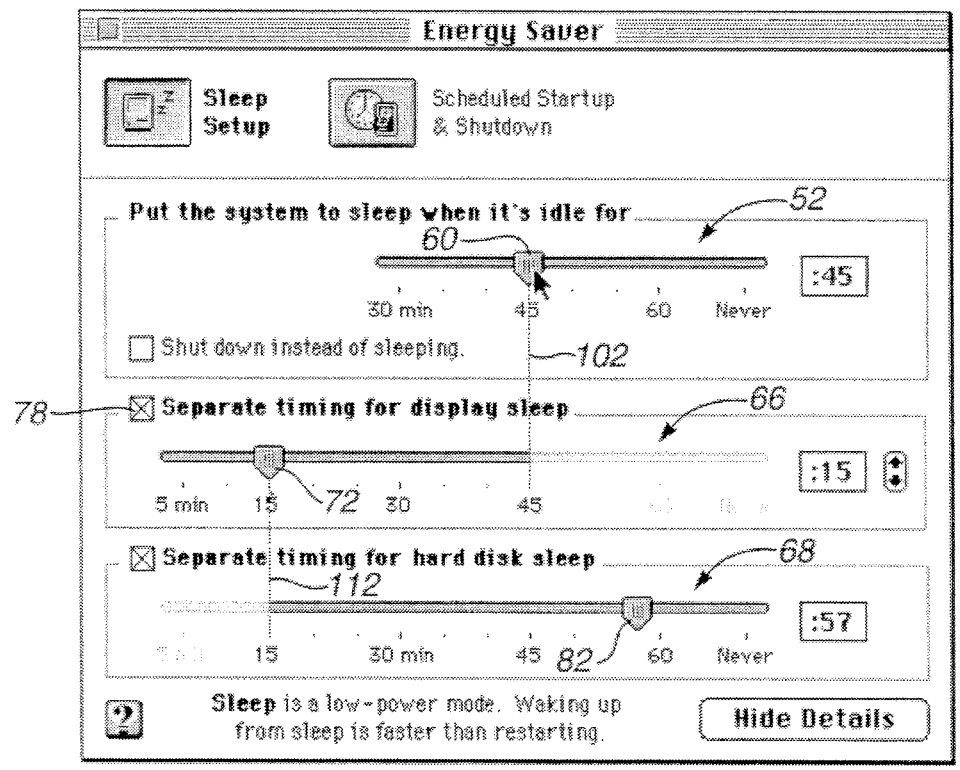
FIG. 2j is an illustration of an alternate embodiment of the master and slave sliders of the present invention in which a first slave slider is a slave of a master slider and a second slave slider is a slave of the first slave slider.

FIG. 2j is an illustration of window 48 showing another alternate embodiment of the present invention, in which two hierarchies of master-slave sliders are implemented. In FIG. 2j, slider 66 is a slave of master slider 52. Master knob 60 is shown being selected and moved by the user with pointer 90. As explained above with reference to FIG. 2g, this movement causes line 102 to be displayed to indicate that the limit to slave knob 72 shifts with master knob 60.

In FIG. 2*j*, slave slider 66 is, in turn, a master slider for slave ("sub-slave") slider 68. That is, slave slider 68 is directly influenced by slider 66 and only indirectly by slider 52. If knob 72 were to be selected with pointer 90 (not shown), then a line 112 would be displayed to indicate the limit for slave knob 82 (a floor in FIG. 2*j*). Note that slave knob 82 can be moved to a higher position than master knob 60 since knob 82 is not a slave of knob 60.

In the embodiment of FIG. 2*j*, knob 72 can track the movement of master knob 60 when slider 66 is in full slave mode (i.e. box 78 is not selected). Likewise, slave knob 82 can track the movement of knob 72 when slider 68 is in full slave mode. Preferably, when slider 66 is toggled to full slave mode, slider 68 is also automatically toggled to full slave mode (if not already in full slave mode). In such a case, slider 68 effectively becomes a slave of master slider 52.

In an alternate embodiment, a slave slider has two or more master sliders. For example, slider 68 might be designated a slave slider to both slider 66 and slider 52. In such a case, the movement of the slave slider could be limited by the positions of all master knobs in partial slave mode. Thus, in FIG. 2*j*, line 102 can be extended so that its lower end reaches guide 80 of slider 68. Slave knob 82 could thus be moved independently on guide 80 only between line 112 and line 102. This allowable range could be increased or decreased by moving master knob 72 and/or master knob 60.

Figure 3:
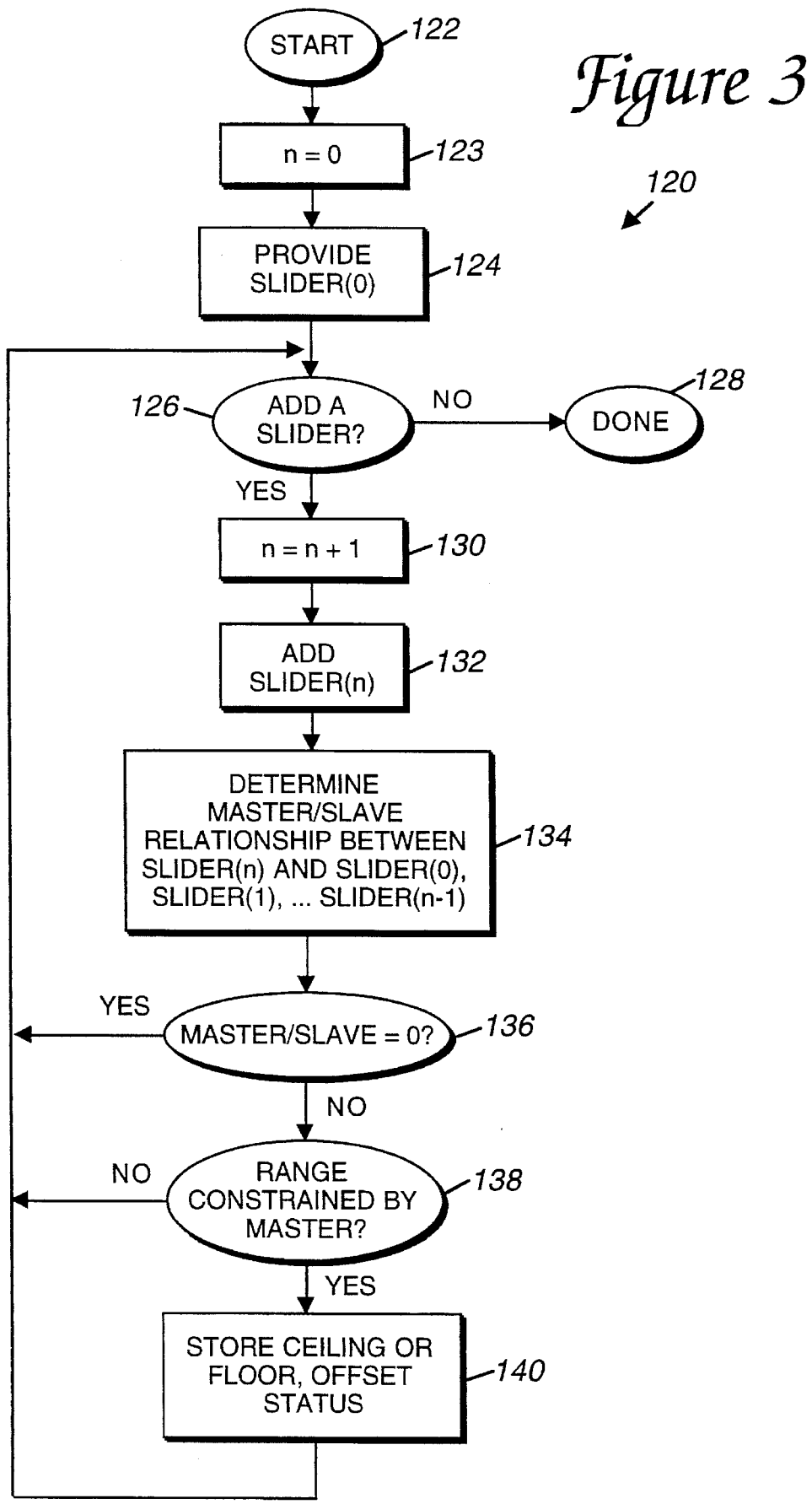
FIG. 3 is a flow diagram illustrating a process of providing linked sliders for the present invention.

FIG. 3 is a flow diagram illustrating a method 120 of providing multiple sliders of the present invention from the designer's point of view. The process begins at 122, and in step 123, a counter n is initialized to 0. Next, in a step 124, a slider is provided as described below.

Sliders have been implemented by commercially available utilities by a variety of methods. One method is to display pixel map images of the various slider components. For example, in FIG. 2*a*, a pixel map can be used for guide 58 and a different pixel map can be used for knob 60. Computer system 10 displays the pixel maps at appropriate locations on the computer screen and moves them using instructions of an application program or utility. To determine the selected value of knob 60, a minimum value, maximum value, and current value can be specified. The position of knob 60 (current value) is compared to the maximum and minimum values to determine the selected value. For example, if a minimum value of 1 and a maximum value of 100 is specified, the position of the knob at the exact middle of the range indicates a value of 50.

In addition, when implementing a slider with pixel maps as described above, a "snap table" can be implemented, which is a software look-up table correlating values on the slider to pixel positions on display screen 20. This table "snaps" the knob to the nearest value specified in the table. Thus, if the knob were moved to a pixel position between two numbers of the scale, such as between the numbers 30 and 35, that pixel position can be looked up in the snap table to find an associated number to snap the knob to, such as "30." Other basic slider controls can also be implemented, such as a "slop rectangle", which is a predetermined distance from the knob that the pointer or cursor must be located within to be able to select the knob.

Sliders can also be implemented by drawing the guide and knob using standard graphics tools available on the computer system 10 instead of displaying pixel maps. Processes for drawing lines on a computer screen are well known to those skilled in the art. For example, on the Apple Macintosh computers, graphics software such as QUICKDRAW from Apple Computer, Inc. of Cupertino, Calif. can be used to draw lines, simple geometrical shapes, etc. A description of the QUICKDRAW graphics software is found in the book *Inside MacIntosh Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line. Since the computer system is drawing the knob at the point where the user moves the pointer, the number on scale 59 selected by the knob is known relative to the two end points. A snap table can also be used in such an embodiment, similar to that described above, to associate the pixel position of the knob to defined numbers and "tick marks", which are the small lines or dots associated with the numbers of the scale 59 that indicate a precise position on guide 58. In addition, the snap table can include a second value for each entry in the table. The second value can indicate to the drawing process how tall a "tick mark" will appear at the associated number, so that tick marks of varying heights can be displayed. This method of implementing slider bars is preferred for the present invention.

Preferably, the designer can specify what units are to appear on the scale of the slider, how long a guide is, the range of options/selections on the slider, the orientation of the slider (e.g., horizontal or vertical), and/or any other parameters necessary in displaying and providing input and output with the slider.

In step 126, the designer determines if another slider should be added. If the answer is no, then the process is completed as indicated at 128. If another slider is to be added, then step 130 is implemented, in which the counter n is incremented. In next step 132, a slider is added as SLIDER(n). In step 134, the master and/or slave relationships between SLIDER(n) and SLIDER(0), SLIDER(1), up to SLIDER(n−1) are determined and stored. This step establishes if SLIDER(n) is a master and/or a slave of any of the already-determined sliders. This relationship is explicitly stored so that a computer system can determine when to limit a slave's movement, track a master slider, etc.

In next step 136, the master/slave relationship of SLIDER(n) is checked. If SLIDER(n) is not a master or slave (i.e., master/slave status=0), then SLIDER(n) is unlinked to any other slider, and the process returns to step 126 to determine if another slider should be added. If SLIDER(n) is a master or slave, then the process continues to step 138, in which it is checked if SLIDER(n) has a range constrained by a master slider. This occurs when SLIDER(n) is a slave slider that is in partial slave mode, as described above with reference to FIG. 2*e*. If it is not desired to provide SLIDER(n) with a partial slave mode, then SLIDER(n) is either has no master slider or is provided with a full slave mode as shown in FIG. 2*i*; the process returns to step 126. If it is desired to provide SLIDER(n) with the limits of a partial slave mode, then step 140 is implemented, in which information is stored for SLIDER(n) indicating the identity of the linked master slider and whether the limit provided by the master slider is a ceiling (limit to higher values) or a floor (limit to lower values). In the alternate embodiment of FIG. 2*j* in which both a ceiling and a floor can be assigned, the appropriate information for both master sliders is stored in this step.

Display information can be stored along with the master/slave information for SLIDER(n). For example, if pixel maps are used to display guide 58, 70, or 80, then multiple pixel maps can be stored and associated with SLIDER(n), each pixel map showing a half tone area corresponding to a possible position of the master knob. One of these pixel maps that corresponds to the proper half tone area is then displayed when appropriate. If the computer system is drawing the knob and guide, the portion of the slave guide from the x-position of he master knob to the upper end point (if a ceiling) or lower end point (if a floor) can be drawn in half tone.

The offset status for SLIDER(n) is also stored in step 140 if SLIDER(n) is a slave. This can be a flag which indicates that when toggled to full slave mode, SLIDER(n) either automatically aligns itself with its master or remains at its current position and retains an offset between itself and its master slider. The process then returns to step 126 to determine if another slider is to be added. Once all the desired sliders have been added, the process is complete at 128.

Figure 4:
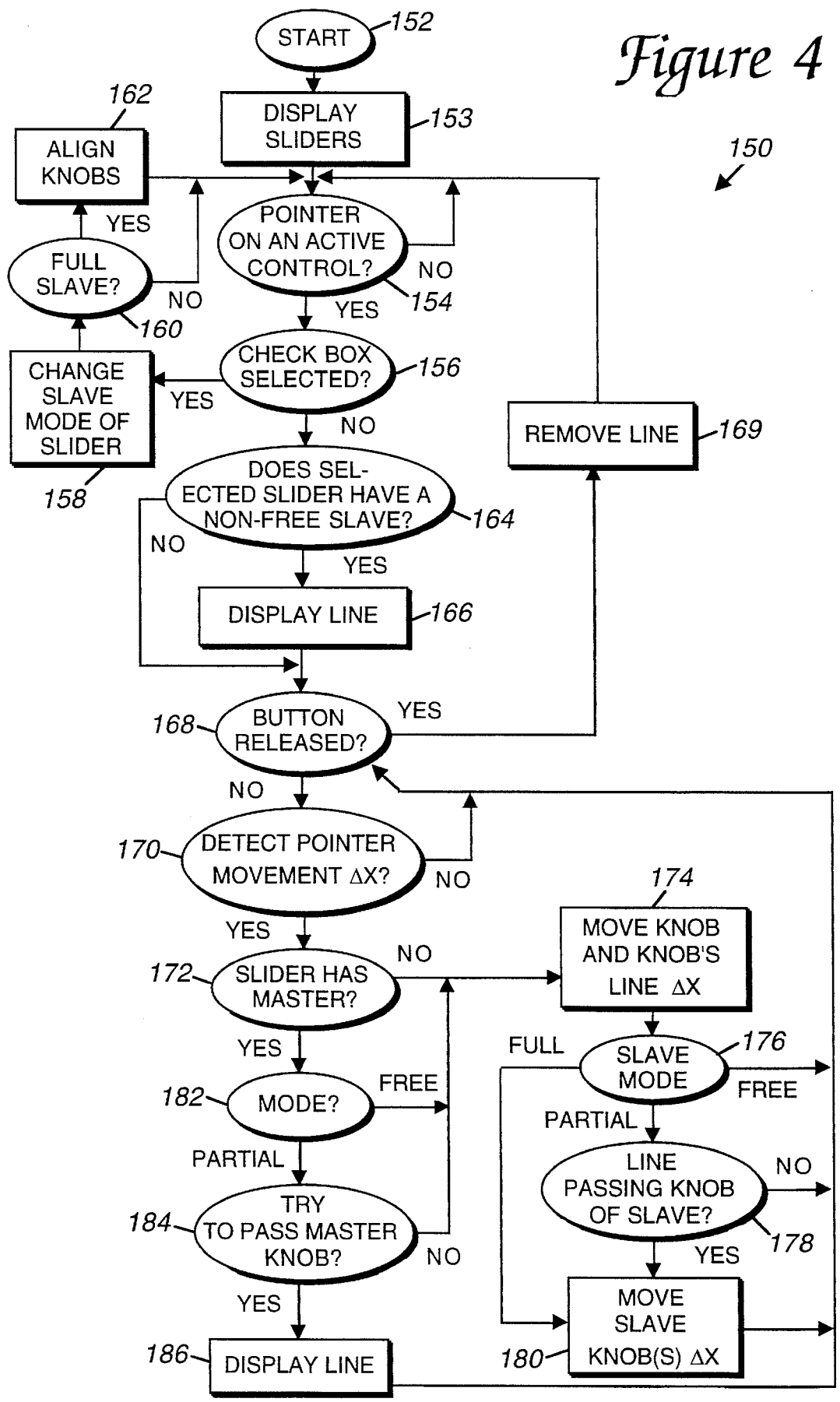
FIG. 4 is a flow diagram illustrating the process of displaying and moving the multiple linked sliders of the present invention.

FIG. 4 is a flow diagram illustrating a method of implementing multiple linked sliders of the present invention. This process responds to user input that manipulates the GUI sliders on the display screen 20 of computer system 10. The process begins at 152 and, in step 153, computer system 10 displays sliders, such as shown in the examples of FIGS. 2a–2j. In this method 150, it is assumed that the user has already selected to view the slave sliders by selecting, for example, detail button 56 as shown in FIG. 2a. Slave slider bars are displayed in half tone in part or in full, when appropriate.

The sliders of the present invention can be implemented in several ways. For example, a separate slider utility can be used for displaying each slider's graphics on the screen. The data indicating a selection of a slider can be sent to a controlling application program, such as the "sleep" application program described above, which provides instructions on how to move the slider, limit its movement, etc. The controlling application program can also send appropriate data and instructions to other slave sliders if appropriate, informing them of their master knob's current position and to provide a limit to the slave knob's movement if appropriate. Alternatively, a master slider application program can handle all of the data that is passed from a master slider and to any slave sliders by building its own data structure with a list of slave sliders for that master slider. The slider application program can send any selected data on the sliders to the controlling application program. This latter embodiment has the advantage of being independent, thus freeing a controlling application program to do other tasks.

In next step 154, process 150 determines if the pointer 90 is on an active control of a slider. Active controls include the knobs 60, 72, and 82 of the sliders 52, 66, and 68; mode boxes 78 and 88; the displays 76 and 86 and associated arrow controls; and other areas of the sliders that can be selected by a user with the pointer. A slider (i.e. knob) that can be selected by the user is known as an "active slider", e.g. sliders shown in half-tone are not active since they cannot be selected.

In step 156, the process 150 determines whether a mode check box, such as mode box 78 or 88, has been selected. This check box is typically only present for a slave slider. If no check box is selected, then step 164 is implemented, as described below. If a check box has been selected, step 158 is implemented, in which the slave mode of the slider associated with the check box is toggled. For example, full slave mode is toggled to partial slave mode, or vice versa. Slave slider bars can also be updated on the screen with half tone graphics or full tone graphics, as appropriate. In next step 160, it is determined if the slider were changed to full slave mode. If so, then step 162 is implemented, in which the knob of the selected slider is aligned with the knob of its master slider. In the alternate embodiment of FIG. 2d, slave knobs are not aligned with their master knobs, and steps 160 and 162 are omitted. After step 162, or if the slider was not changed to full slave mode in step 160, then the process returns to step 154 to check if the pointer is on an active control.

If a mode check box is not selected in step 156, then process 150 assumes that a slider's knob was selected. The process 150 checks if the selected slider has a non-free slave, i.e., a slave that does not have the free slave mode as shown in FIG. 2i. If so, then the selected slider is a master slider, and step 166 is implemented to display line 102, as shown in FIG. 2g. In other embodiments, other types of indications can be displayed to indicate that the limit to the slave knob's movement is being moved with the master knob. After step 166, or if the selected slider does not have a non-free slave, then step 168 is implemented, in which process 150 checks whether the button on the pointing device has been released to indicate that the user is no longer moving the selected knob. In alternate embodiments, other equivalent indications can be made, such as removing a stylus from a tablet, releasing a key on a keyboard, etc. If the button has been released, then line 102 is removed from the screen in step 169, and the process returns to step 154. If the button has not been released, then in step 170, process 150 checks whether pointer movement in an x-direction is detected. In embodiments where a vertical slider is implemented, movement in the y-direction is checked. If no such movement is detected, then step 168 is again implemented.

If movement in an x-direction has been detected, then step 172 is implemented, in which process 150 checks whether the selected slider is a slave of a master slider. If so, then step 182 is performed, as described subsequently. If the selected slider does not have a master slider, then step 174 is implemented, in which the selected knob is moved ΔX, which is the distance from the knob's old position to the new position in the desired x-direction. If the selected knob has a slave in partial slave mode, then line 102 is also moved with the selected knob in step 174. In next step 176, the slave modes of any slaves of the selected slider are determined. For each slave having a full slave mode, step 180 is implemented, as described below. For each slave having a free slave mode, no further steps are performed, and the process returns to step 168. For each slave having a partial slave mode, step 178 is implemented, in which the process checks whether the line 102 displayed with the knob passes the knob of the slave, as described above with reference to FIG. 2g. If not, the process returns to step 168. If so, step 180 is implemented, in which the slave knobs for the selected slider are moved AX, which is the same distance and direction that the master knob was moved. Step 180 of moving slave knobs is also performed if the slave is determined to be in full slave mode in step 176. After step 180, the process returns to step 168.

If the selected slider is determined to have a master in step 172, then the process continues to step 182, in which the slave mode of the selected slider is determined. This mode can either be partial slave mode or free slave mode (the mode cannot be full slave mode, since a slave slider in full slave mode cannot be selected). If in free slave mode, the process continues to step 174 as described above. If in partial slave mode, process 150 checks in step 184 if the user is trying to move the selected knob pass the master knob, i.e., past the border into the prohibited portion of the slave guide, as shown in FIG. 2f above. If the knob does not pass the master knob, then the knob is moved in step 174 as described above. If the knob is attempted to be moved past the master knob, then the selected knob is moved to this limit and line 102 is displayed at the current position of the master knob in step 186, as shown in FIG. 2f. After step 186, the process returns to step 168 to check whether the pointing device button has been released.

While this invention has been described in terms of several preferred embodiments, it is contemplated that alterations, modifications and permutations thereof will become apparent to those skilled in the art upon a reading of the specification and study of the drawings. For example, the sliders of the present invention can be implemented in a variety of ways. The sliders can be oriented horizontally, vertically, or at an angle. The knobs can move in one, two, or (apparently) three dimensions on the screen. The knob of the sliders can appear as shown in the Figures or appear as a knob, switch, etc. In addition, the sliders can be selected and manipulated by a variety of input devices. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for manipulating GUI sliders on a display of a computer system, the method comprising:

displaying a master slider and a slave slider on a display of a computer system, said master slider including a master knob, and said slave slider including a slave knob;

displaying a mode indicator on said display said mode indicator indicating a mode of said slave slider that is selectable by a user, wherein available modes of said slave slider include a full slave mode and a partial slave mode;

moving said master knob in response to input from a user from a first position to a second position along said master slider; and automatically influencing a movement of said slave knob based on said master knob, such that in said full slave mode said slave knob moves in the same direction and in the same amount that said master knob is moved, regardless of direction and initial positioning of said slave knob.

2. A method as recited in claim 1 wherein said master knob moves along a linear master guide, and wherein said slave knob moves along a linear slave guide.

3. A method as recited in claim 2 wherein said moving of said master knob includes selecting said master knob with a pointer and dragging said master knob with said pointer.

4. A method as recited in claim 3 wherein said full slave mode automatically influences movement of said slave knob causing said slave knob to be aligned with said master knob, upon selection of said full slave mode.

5. A method as recited in claim 3 wherein said slave slider in said full slave mode cannot be directly selected and moved by said user.

6. A method as recited in claim 5 wherein said partial slave mode allows said slave knob to be directly selected and moved by said user when said slave slider is in said partial slave mode.

7. A method as recited in claim 6 wherein when said partial slave mode is selected by the user, said influencing of the movement of said slave knob includes providing a limit to said movement of said slave knob based on a position of said master knob.

8. A method as recited in claim 7 wherein said influencing of the movement of said slave knob includes displaying a line indicating said limit when said slave slider is in said partial slave mode.

9. A method as recited in claim 8 wherein said line is displayed when said slave knob attempts to move past said limit.

10. A method as recited in claim 8 wherein said line is displayed when said master knob is moved.

11. A method as recited in claim 6 wherein said slave knob is offset in position from said master knob in said full slave mode.

12. A method as recited in claim 6 wherein said master slider and said slave slider are provided to adjust an amount of time said computer system is to be inactive before said computer system powers down.

13. A method as recited in claim 12 wherein said master slider controls an amount of time said computer system is to be inactive before said computer system powers down, and said slave slider controls an amount of time said computer system is to be inactive before said display of said computer system powers down.

14. A method as recited in claim 7 further comprising:

displaying a second slave slider having a second slave knob; and influencing a movement of said second slave knob based on a position of said slave knob.

15. A method as recited in claim 1 wherein said mode indicator is a mode switch that may be toggled by said user to toggle said mode.

16. A method as recited in claim 15 wherein said displaying of said master slider and said slave slider further comprises displaying a sub-slave slider having a sub-slave knob, wherein said sub-slave slider can be selectively influenced by said slave slider and said master slider.

17. A method as recited in claim 16 wherein said displaying of said mode indicator further comprises displaying a second mode switch for said sub-slave slider on said display, wherein said second mode switch is selectable by the user to set said sub-slave slider to a full slave mode, and alternatively in at least one of a partial slave mode, and a free mode, with respect to said master slider.

18. A method as recited in claim 17 wherein, in said full slave mode, movement of said master knob automatically influences movement of said sub-slave knob, wherein said sub-slave knob is aligned with said master knob upon selection of said full slave mode.

19. A method as recited in claim 18 wherein said sub-slave knob is offset in position from said slave knob in said full slave mode.

20. A method as recited in claim 16 wherein said displaying of said mode indicator further includes displaying a second mode switch for said sub-slave slider on said display, wherein said second mode switch is selectable by the user to set said sub-slave slider to a full slave mode, and alternatively in at least one of a partial slave mode, and a free mode, with respect to said slave slider.

21. A method as recited in claim 20 wherein said sub-slave knob is offset in position from said master knob in said full slave mode.

22. A method as recited in claim 16 wherein, in said full slave mode, movement of said slave knob automatically influences movement of said sub-slave knob, wherein said sub-slave knob is aligned with said slave knob upon selection of said full slave mode.

23. A computer apparatus with linked sliders comprising:

a digital processor;

read/write memory coupled to said digital processor;

a display coupled to said digital processor;

means for displaying a master slider, a slave slider, and a mode selector on said display, wherein each of said sliders includes a knob and a guide, each of said knobs being displayed along a portion of its respective guide, and wherein said slave slider can be operated in a full slave mode, or in at least one of a partial slave mode and a free mode based upon a setting of said mode selector that is selectable by a user to toggle said modes;

means for moving said knob of said master slider along its guide in response to a pointer controlled by the user; and means for moving a knob of said slave slider, wherein said movement of said knob of said slave slider is influenced by a position of said knob of said master slider on said guide, such that in said full slave mode said slave knob moves in the same direction and in the same amount that said master knob is moved, regardless of direction and initial positioning of said slave knob.

24. A computer apparatus as recited in claim 23 further comprising a pointing device coupled to said digital processor and controlled by said user, said pointing device being operative to control said pointer on said display.

25. A computer apparatus as recited in claim 24 wherein said means for moving said slave knob includes means for providing a limit to said movement of said slave knob based on the current position of said master knob when said slave knob is in said partial slave mode.

26. A computer apparatus as recited in claim 25 further comprising means for displaying a line indicating said limit to said movement of said slave knob.

27. A computer apparatus as recited in claim 24 further comprising:

means for displaying a second slave slider on said display; and means for moving said second slave knob based on the position of said master knob.

28. A computer apparatus as recited in claim 27 wherein said means for moving said slave knob includes means for moving said slave knob independently of said master knob when said slave slider is in said free mode.

29. A computer apparatus as recited in claim 24 wherein said master slider and said slave slider include indicia, and wherein said guide of said master slider and said slave slider are displayed substantially parallel to one another such that indicia on said master slider are substantially aligned with indicia on said slave slider.

30. A method for manipulating a plurality of sliders provided on a computer system, the method comprising:

displaying a master slider having a master knob on a display screen, said master knob being operative to move in accordance with input from a pointing device controlled by a user;

displaying a slave slider having a slave knob on said display screen;

displaying a mode selector for said slave slider on said display screen, said mode selector being responsive to a selection from said user to set said slave slider to a partial slave mode, or alternatively to at least one of a full slave mode, and a free mode;

influencing movement of a slave knob of said slave slider based on movement of said master knob, wherein said master knob is moved within a master guide and said slave knob is moved within a slave guide, and wherein, in said partial slave mode, said slave knob is prevented from moving past a position in said slave guide corresponding to a position of said master knob in said master guide; and displaying an indication of said influence on said movement of said slave slider.

31. A method as recited in claim 30 wherein, in said full slave mode, said slave knob moves in the same direction and in the same amount that said master knob is moved, regardless of direction and initial relative positions of said slave knob and said master knob.

32. A method as recited in claim 30 wherein, in said partial slave mode, said slave knob moves in accordance with said master knob when said master knob is moved past said position of said slave knob.

33. A method as recited in claim 30 wherein, in said partial slave mode, said displaying of an indication of said influence includes displaying a line at said position of said master knob to indicate said limited movement of said slave knob, said line extending to said position of said slave guide corresponding to said position Of said master knob in said master guide.

34. A method as recited in claim 30 wherein said displaying of an indication of said influence includes displaying said slave slider in a less distinct shade than said master slider.

35. A method as recited in claim 30 further comprising displaying a plurality of slave sliders each having a slave knob on said display screen, wherein the movement of said master knob influences movement of said slave knobs of said plurality of slave sliders.

36. A method for producing GUI slider bars with master/slave relationships comprising:

providing a first slider having a first linear guide and a first knob engaged with said first linear guide, said first knob being operative to move along said first linear guide;

adding a second slider having a second linear guide and a second knob engaged with said second linear guide, said second knob being operative to move along said second linear guide;

determining a master-slave relationship between said first slider and said second slider by determining that said second slider is a slave of said first slider, and wherein said second slider is provided with a full slave mode and a partial slave mode selectable by a user; and displaying images of said first slider and said second slider on a display of a computer system, wherein for said full slave mode said images appear on said display such that said second knob tracks said first knob whenever said first knob is displayed as moving, regardless of direction and initial relative positioning of said slave knob and said master knob.

37. A method as recited in claim 36 wherein when said second slider is determined to be a slave of said first slider, a limit to a movement of said second slider based on said first slider is determined for said partial slave mode.

38. A method as recited in claim 37 wherein said limit is determined as either a ceiling or a floor.

39. A method as recited in claim 36 wherein when said second slider is determined to be a slave of said first slider, an offset status is determined for said second slider, said offset status indicating whether said second slider automatically aligns its position with said first slider when said second slider is changed from said partial slave mode to said full slave mode.

40. A method for controlling GUI sliders with master/slave relationships comprising:

displaying a master slider and a slave slider on a computer screen;

displaying a mode selector for said slave slider on said computer screen;

determining when a pointer controlled by a user is selecting said mode selector to set a mode of said slave slider to a full slave mode, and alternatively to at least one of a partial slave mode and a free mode;

determining when said pointer is selecting an active slider, wherein said active slider is one of said master slider and said slave slider;

detecting movement of said pointer;

moving an active knob of said active slider in accordance with said pointer;

limiting said movement of said active knob when said active slider is said slave slider, said limit being based on a position of a master knob of said master slider and said mode of said slave slider; and moving a slave knob of said slave slider in accordance with said movement of said active knob when said active slider is said master slider, such that in said full slave mode said slave knob moves in the same direction and in the same amount that said master knob is moved regardless of direction of said master knob and relative positions of said master knob and said slave knob.

41. A method as recited in claim 40 wherein said slave knob is moved in accordance with said movement of said active knob only in said full slave mode.

42. A method as recited in claim 41 further comprising determining when a mode selection box has been selected by said pointer to toggle said full slave mode to said partial slave mode or said partial slave mode to said full slave mode.

43. A method as recited in claim 42 wherein said active knob is moved in a single dimension in accordance with movement of said pointer in said single dimension.

44. A method as recited in claim 43 wherein when said active slider is said slave slider, a line is displayed at said limit to said movement of said slave knob.

45. A method as recited in claim 43 wherein when said active slider is said master slider, and when said slave slider is in said partial slave mode, said slave knob is moved in accordance with said active knob when said active knob is moved past said slave knob.

46. A method as recited in claim 43 wherein a line is displayed on said slave slider bar indicating said limit when said master slider is said active slider.

* * * * *

UNITED STATES PATENT AND TRADEMARK OFFICE
CERTIFICATE OF CORRECTION

PATENT NO   :   5,615,347

DATED       :   March 25, 1997

INVENTOR(S) :   Lisa L. Davis, et al.

It is certified that error appears in the above-identified patent and that said Letters Patent is hereby corrected as shown below:

In claim 33, line 6, delete "said position Of" and insert therefor
- -said position of- -.

In claim 40, line 25, delete "knob is moved" and insert therefor
- -knob is moved,- -.

Signed and Sealed this

Sixth Day of April, 1999

Attest:

Q. TODD DICKINSON

Attesting Officer

Acting Commissioner of Patents and Trademarks